(12) United States Patent
Onozawa et al.

(10) Patent No.: US 8,333,478 B2
(45) Date of Patent: Dec. 18, 2012

(54) GLARE-PROOFING AND LIGHT-TRANSMITTING HARD COAT FILM

(75) Inventors: Yutaka Onozawa, Itabashi-ku (JP); Satoru Shoshi, Itabashi-ku (JP)

(73) Assignee: Lintec Corporation, Tokyo (JP)

( * ) Notice: Subject to any disclaimer, the term of this patent is extended or adjusted under 35 U.S.C. 154(b) by 359 days.

(21) Appl. No.: 12/602,025

(22) PCT Filed: May 27, 2008

(86) PCT No.: PCT/JP2008/060116
§ 371 (c)(1),
(2), (4) Date: Nov. 25, 2009

(87) PCT Pub. No.: WO2008/146939
PCT Pub. Date: Dec. 4, 2008

(65) Prior Publication Data
US 2010/0208352 A1    Aug. 19, 2010

(30) Foreign Application Priority Data

May 29, 2007  (JP) .................................. 2007-141926

(51) Int. Cl.
*G02B 27/00* (2006.01)
(52) U.S. Cl. ........................................ 359/601; 359/599
(58) Field of Classification Search .................. 359/599, 359/601
See application file for complete search history.

(56) References Cited

U.S. PATENT DOCUMENTS

| | | | |
|---|---|---|---|
| 2001/0048559 A1* | 12/2001 | Matsunaga et al. | 359/613 |
| 2005/0152034 A1 | 7/2005 | Matsunaga et al. | |
| 2005/0207016 A1* | 9/2005 | Ando | 359/586 |
| 2007/0042173 A1* | 2/2007 | Nagaoka et al. | 428/313.9 |
| 2008/0090063 A1* | 4/2008 | Inokuma et al. | 428/220 |

FOREIGN PATENT DOCUMENTS

| | | |
|---|---|---|
| JP | 2000-047010 A | 2/2000 |
| JP | 2001-305314 A | 10/2001 |
| JP | 2002-082207 A | 3/2002 |
| JP | 2003-248110 A | 9/2003 |
| JP | 2006-146027 A | 6/2006 |
| JP | 2007-041533 A | 2/2007 |
| JP | 2007-122077 A | 5/2007 |

\* cited by examiner

*Primary Examiner* — Thong Nguyen
(74) *Attorney, Agent, or Firm* — Sughrue Mion, PLLC

(57) ABSTRACT

A film includes a cured resin layer (A) of a curable composition containing an active energy ray curable compound and a microparticle dispersed therein and a cured resin layer (B) of a curable composition containing an active energy ray curable compound and a microparticle dispersed therein laminated in order on at least one surface of a light-transmitting substrate film, wherein the total film thickness of layer (A) and layer (B) is 1 to 10 μm, a microparticle (a) having an average particle size of 0.5 to 10 μm is compounded in layer (A) in an amount of 0.5 to 60 parts by mass to 100 parts by mass of an active energy ray curable compound, and a microparticle (b) having an average particle size which is less than an average particle size of the microparticle (a) is compounded in layer (B).

8 Claims, 1 Drawing Sheet

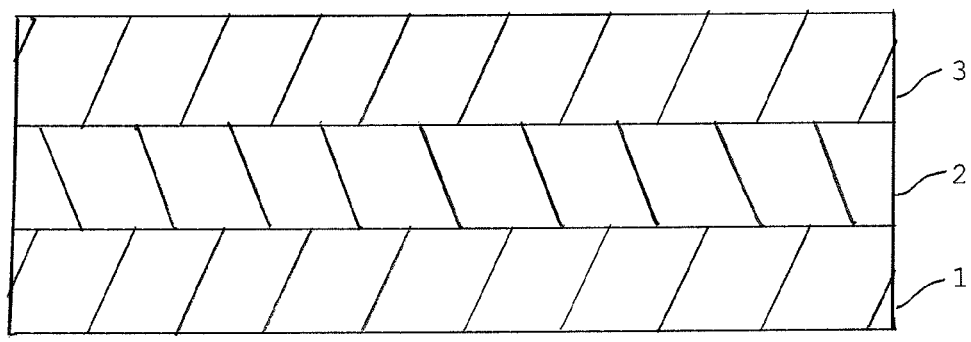

GLARE-PROOFING AND LIGHT-TRANSMITTING HARD COAT FILM

TECHNICAL FIELD

The present invention relates to a glare-proofing and light-transmitting hard coat film which can be utilized for liquid crystal displays (LCD), plasma displays (PDP) and the like.

BACKGROUND ART

A glare-proofing and light-transmitting hard coat film has been utilized broadly in uses for LCD and touch panel utilized in combination with LCD. Recently, the utilization of the glare-proofing and light-transmitting hard coat film are further spreading to uses for PDP.

Conventionally, as the glare-proofing and light-transmitting hard coat film, a high delicate grade product for the purpose of improving visibility has been preferred, but, recently, a high contrast grade product capable to display a black color on an image more intensely is demanded in addition to the high delicate grade product.

For such a demand, there is a suggested glare-proofing and light-transmitting hard coat film in which a clear cured resin layer is laminated to a cured resin layer containing a microparticle (referred to, for example, Japanese Patent publication No. Hei 10-325901A). Such a suggestion can obtain a proper surface roughness by forming the clear cured resin layer as the most outside surface layer and display a black color on an image more intensely. However, there is a problem that such a suggestion is insufficient in the glare-proofing property.

Further, there is a suggested glare-proofing and light-transmitting hard coat film in which a glare-proofing layer is laminated to a light-diffusing layer (referred to Japanese Patent publication No. 2004-4777A). In such a suggestion, it is described that the light-diffusing layer is formed as flat as possible, and an irregularity is formed by the glare-proofing layer. However, there is a problem that such a manner is insufficient to display a black color on an image more intensely, because the surface roughness of the most outside surface layer is larger than the surface roughness of the lower substrate.

DISCLOSURE OF THE INVENTION

An object of the present invention is to provide, by solving the above described problems, a glare-proofing and light-transmitting hard coat film which can have a satisfactory level of a glare-proofing property and display a black color on an image more intensely (called as "improvement of color tone" in the present invention).

The present inventors have discovered, as a result of a diligent study concerning the display of the high contrast carried out to solve the above described problems, that the high contrast is influenced larger by the shape of the irregularity in the surface and the height of the convex, and that the range capable to control the contrast by the irregularity of the surface is narrow in the glare-proofing and light-transmitting hard coat film having only one layer of the cured resin layer of the curable composition containing an active energy ray curable compound and a microparticle dispersed therein and therefore, it is difficult to meet the display of the further high contrast after now.

Also, the present inventors have discovered, as a result of a further diligent study, that the above described problems can be solved by using a glare-proofing and light-transmitting hard coat film, which comprises a cured resin layer (A) of a curable composition containing an active energy ray curable compound and a microparticle dispersed therein and a cured resin layer (B) of a curable composition containing an active energy ray curable compound and a microparticle dispersed therein, and the layer (A) and the layer (B) being laminated in order on at least one surface of a light-transmitting substrate film, wherein a total film thickness of the layer (A) and the layer (B) is 1 to 10 μm, a microparticle A having an average particle size of 0.5 to 10 μm is compounded in the layer (A) in an amount of 0.5 to 60 parts by mass to 100 parts by mass of an active energy ray curable compound, and a microparticle B having an average particle size which is less than an average particle size of the microparticle A is compounded in the layer (B).

The present inventors have perfected the present invention by the discoveries described above.

Specifically, the present invention provides a glare-proofing and light-transmitting hard coat film, which comprises a cured resin layer (A) of a curable composition containing an active energy ray curable compound and a microparticle dispersed therein and a cured resin layer (B) of a curable composition containing an active energy ray curable compound and a microparticle dispersed therein, and the layer (A) and the layer (B) being laminated in order on at least one surface of a light-transmitting substrate film, wherein a total film thickness of the layer (A) and the layer (B) is 1 to 10 μm, a microparticle A having an average particle size of 0.5 to 10 μm is compounded in the layer (A) in an amount of 0.5 to 60 parts by mass to 100 parts by mass of an active energy ray curable compound, and a microparticle B having an average particle size which is less than an average particle size of the microparticle A is compounded in the layer (B).

Additionally, the present invention provides the glare-proofing and light-transmitting hard coat film as described above, wherein a film thickness of the layer (A) is not less than a film thickness of the layer (B).

Further, the present invention provides the glare-proofing and light-transmitting hard coat film as described above, wherein the microparticle B in the layer (B) has an average particle size of 0.005 to 1 μm.

Furthermore, the present invention provides the glare-proofing and light-transmitting hard coat film as described above, wherein at least one microparticle in the layer (A) and/or the layer (B) is a conductive microparticle.

BRIEF DESCRIPTION OF THE DRAWING

The FIGURE shows an embodiment of the present invention.

PREFERRED EMBODIMENTS FOR CARRYING OUT THE INVENTION

In the present invention, various plastic sheets and films can be used as the light-transmitting substrate film. Examples of the light-transmitting substrate film include films of various synthetic resin such as cellulose based resins such as diacetyl cellulose, triacetyl cellulose and acetylcellulose butylate; polyolefin resins such as polyethylene resins and polypropylene resins; polyester resins such as polyethylene terephthalate resin, polyethylene naphthalate resin and polybutylene terephthalate resin; polyvinyl chloride resins, polystyrene resins, polyurethane resins, polycarbonate resins, polyamide resins, polyimide resins and fluorine resins. In view of high strength and cheep cost, the films of polyester resins such as polyethylene terephthalate resins are particularly preferable.

The light-transmitting substrate film can be composed of a single layer or two or more multi-layers of same kind or different kinds.

A thickness of the plastic film is not limited particularly, and is usually preferably in a range of from 10 to 350 μm, more preferably in a range of from 25 to 300 μm and most preferably in a range of from 50 to 250 μm.

To the surface of the light-transmitting substrate film, an easy adhesive treatment can be applied. The easy adhesive treatment is not limited particularly, and for example, includes corona discharge treatment and a formation of a layer of resin polymer having lower molecular weight which is the same component as the resin of the light-transmitting substrate film. For example, when the light-transmitting substrate film is composed of the polyester resin such as, for example, polyethylene terephthalate resin, the resin polymer having lower molecular weight includes polyester resin having lower molecular weight such as, for example, ethylene terephthalate oligomer.

In the present invention, the cured resin layer of a curable composition containing an active energy ray curable compound and a microparticle A dispersed in the composition as the layer (A) is formed on at least one surface of a light-transmitting substrate film.

In the present invention, also, the cured resin layer of a curable composition containing an active energy ray curable compound and a microparticle B dispersed in the composition as the layer (B) is formed on the cured resin layer of the layer (A) as described above.

The cured resin layer of a curable composition containing an active energy ray curable compound and a microparticle dispersed in the composition can be formed by applying the composition containing an active energy ray curable compound and a microparticle dispersed in the composition, and optionally drying, and then, irradiating with an active energy ray to cure the applied composition. When the curable composition for forming the layer (B) is applied to a surface of the cured resin layer of the layer (A), the cured resin layer of the layer (A) may be in a state that the curing is proceeded sufficiently, or in a state of a halfway stage before the curing is proceeded sufficiently, that is, what is called, "half curing." When the cured resin layer of the layer (A) is in the state of half curing, the adhesion between the layer (A) and the layer (B) can be improved.

The microparticles used in the layer (A) and the layer (B) include organic microparticles and inorganic microparticles. The organic microparticles include microparticles of polystyrene based resin, styrene-acrylic based copolymer resin, acrylic based resin, amino based resin, divinylbenzene based resin, silicone based resin, urethane based resin, melamine based resin, urea based resin, phenol based resin, benzoguanamine based resin, xylene based resin, polycarbonate based resin, polyethylene based resin, poly vinyl chloride based resin and the like. Among them, silicone microparticle composed of silicone resin is preferable.

Also, the inorganic microparticles used in the layer (A) and the layer (B) include microparticles of silica, alumina, titania, zirconia, tin oxide, indium oxide, cadmium oxide, antimony oxide and the like. Among them, silica microparticles are preferable, and synthetic silica microparticles are more preferable.

Also, the microparticle can be a conductive microparticle for exerting an antistatic property. The conductive inorganic microparticle includes microparticles of tin oxide, antimony-doped tin oxide (ATO), indium oxide-tin oxide (ITO), zinc oxide, antimony oxide and the like. The conductive organic microparticle includes microparticles in which a conductive compound is coated to a surface of the organic microparticles such as silicone microparticle and the like, carbon microparticle and the like.

As the microparticle used in the layer (A) and the layer (B), one member selected from the inorganic microparticle and the organic microparticle can be used, or two or more members selected from either or both of the inorganic microparticle and the organic microparticle can be used together. As the microparticle used in the layer (B), one member selected from the inorganic microparticle and the organic microparticle is preferable. When the microparticles are used in combination of plural microparticles, a difference of the refractive index is caused, and therefore, the light is scattered and whitish color may be observed.

The shape of the microparticles used in the layer (A) and the layer (B) is not limited in particular, and includes various shapes such as, for example, amorphous shape and perfect sphere shape. In view of the glare-proofing property, the amorphous shape is preferable.

The average particle size of the microparticle B used in the layer (B) is not more than an average particle size of the microparticle A used in the layer (A). When the average particle size of the microparticle B used in the layer (B) is larger than the average particle size of the microparticle used in the layer (A), the bottom of the irregularity in the surface of the layer (A) can be not embedded, and therefore, the irregularity in the surface of the layer (B) can be larger and the improvement effect of color tone can be not obtained.

Concretely, in the layer (A), the microparticle A having an average particle size of 0.5 to 10 μm, preferably 1 to 8 μm, and more preferably 2 to 6 μm, is compounded in an amount of 0.5 to 60 parts by mass, preferably 2 to 20 parts by mass, and more preferably 3 to 10 parts by mass to 100 parts by mass of the active energy ray curable compound. By using the microparticle A having the average particle size described above and in the amount described above in the layer (A), a surface having a large and gentle irregularity can be obtained without imparting transparency. If such a irregularity surface is obtained in the layer (A), it is sufficient in the layer (A). If the condition is not broken, a microparticle having a smaller average particle size can be further compounded in addition to the microparticle A described above in the layer (A). For example, a microparticle having an average particle size of 0.2 to 0.01 μm can be compounded together in an amount of 0 to 200 parts by mass to 100 parts by mass of the active energy ray curable compound. Thus, supplementary functions such as an exertion of an antistatic property, an increase of hardness of the cured resin layer, and an absorption of light having specific wave length, can be obtained together.

On the other hand, in the layer (B), the microparticle B having an average particle size which is less than an average particle size of the microparticle A, is compounded. By forming the layer (B) containing the microparticle B, the surface having a large and gentle irregularity formed in the layer (A) can be maintained, or further, the surface having a gentler irregularity can be obtained. In addition, a difference of elevation between the area in which the microparticle A is existed and the area in which the microparticle A is not existed, can be decreased, and a surface having a fine irregularity formed by using the microparticle B can be obtained.

Concretely, the average particle size of the microparticle B used in the layer (B) is usually in the range of 0.001 to 7 μm, preferably in the range of 0.005 to 1 μm, and more preferably in the range of 0.009 to 0.49 μm. The difference of the average particle sizes of the microparticles of the layer (A) and the layer (B) is preferably more than 0 μm and not more than 5.0 μm and more preferably 0.5 to 3.0 μm.

Next, the compounding amount of the microparticle B in the layer (B) is preferably 0.01 to 500 parts by mass, more preferably 0.05 to 400 parts by mass, and most preferably 0.1 to 300 parts by mass to 100 parts by mass of the active energy ray curable compound. If the compounding amount of the microparticle B used in the layer (B) is lower too, the glare-proofing property may be obtained sufficiently. If the compounding amount of the microparticle B used in the layer (B) is higher too, the antiscratch property of the surface of the obtained glare-proofing and light-transmitting hard coat film may be decreased, or the optical characteristics may be impaired.

The compounding ratio (mass ratio) of the microparticle B in the layer (B) to 100 parts by mass of the active energy ray curable compound is preferably higher than the compounding ratio of the microparticle A in the layer (A) to 100 parts by mass of the active energy ray curable compound, and preferably 5 to 150 times, more preferably 10 to 120 times, and most preferably 15 to 100 times of the compounding amount of the microparticle A in the layer (A) to 100 parts by mass of the active energy ray curable compound.

As mentioned above, the most outside surface of the glare-proofing and light-transmitting hard coat film formed by laminating the layer (A) containing the microparticle A and the layer (B) containing the microparticle B, can be a surface having a large and gentle irregularity and a fine irregularity together. At the result, a scattering of light can be controlled, and the glare-proofing and light-transmitting hard coat film having no the introduction of reflection, the glare-proofing property and the improvement of color tone, can be obtained.

The center line average roughness, Ra (B) of the surface of the layer (B) after the layer (B) is laminated, is usually preferably in the range of 0.1 to 0.5 μm, and more preferably in the range of 0.15 to 0.4 μm.

Further, the maximum height, Rz(B) of the irregularity in the surface of the layer (B) after the layer (B) is laminated, is preferably in the range of 0.10 to 2.70 μm, more preferably in the range of 0.5 to 2.50 μm, and most preferably in the range of 1.00 to 2.00 μm. For obtaining the improvement of color tone and the exertion of the glare-proofing property together, Rz(B) in the range described above is preferable.

The active energy ray curable compound includes unsaturated monomers, oligomers, resins, and compositions thereof, and the like. Examples of the active energy ray curable compound include polyfunctional active energy ray curable acrylic based compounds having two or more functional groups, such as polyfunctional acrylates, urethane acrylates, or polyester acrylates. The urethane acrylates and the polyester acrylates are preferable.

The polyfunctional acrylates include ethylene glycol di(meth)acrylate, propylene glycol di(meth)acrylate, butylene glycol di(meth)acrylate, neopentyl glycol di(meth)acrylate, hexane diol di(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol haxa(meth)acrylate, glycelol tri(meth)acrylate, triallyl(meth)acrylate, and bisphenol A ethylene oxide modified di(meth)acrylate.

The urethane acrylates is obtained, for example, by esterification of the reaction of (meth)acrylic acid with the hydroxyl group of polyurethane oligomer which is obtained by reacting polyether polyol or polyester polyol with polyisocyanate.

The polyester acrylate is obtained, for example, by esterificating (meth)acrylic acid with the hydroxyl group of a polyester oligomer having hydroxyl groups at both ends which is obtained by reacting a polycarboxyl acid with a polyhydric alcohol, or by esterificating a (meth)acrylic acid with the end hydroxyl group of a polyester oligomer which is obtained by addition reaction of a polycarboxyl acid with an alkylene oxide.

The active energy ray curable compound can be used singly or in combination of two or more members.

The active energy ray includes ultraviolet ray, electron beam, $\alpha$ ray, $\beta$ ray and $\gamma$ ray. When the ultraviolet ray is used, a photopolymerization initiator is preferably contained in the curable composition.

As the photopolymerization initiator, conventional photopolymerization initiators such as acetophenone based and benzophenone based photopolymerization initiators can be used, and also, oligomer based photopolymerization initiators can be used.

The photopolymerization initiators can be used singly or in combination of two or more members.

The compounding ratio of the active energy ray curable compound and the photopolymerization initiator is usually preferably 0.01 to 20 parts by mass, and more preferably 0.1 to 10 parts by mass of the photopolymerization initiator to 100 parts by mass of the active energy ray curable compound.

In the present invention, the total film thickness of the layer (A) and the layer (B) is in the rage of 1 to 10 μm, preferably in the range of 2 to 8.5 μm, and more preferably in the range of 3 to 7 μm. If the total film thickness of the layer (A) and the layer (B) is less than 1 μm, the inhibition of curing of the active energy ray curable compound is caused with oxygen and the like, and therefore, it is difficult to obtain the hard coat property. If the total film thickness of the layer (A) and the layer (B) is more than 10 μm, the hard coat property is superior, but there is a possibility that a curl is caused, or a bad influence is caused to optical characteristics such as transparency.

In the present invention, the film thickness of the layer (B) is preferably not more than the film thickness of the layer (A). If the film thickness of the layer (B) is larger than the film thickness of the layer (A), the irregularity in the surface of the layer (A) may be embedded perfectly, and the glare-proofing effect may be not obtained. If the film thickness of the layer (B) is smaller too, the bottom of the irregularity in the surface of the layer (A) may be not embedded, and the improvement effect of the color tone may be not obtained sufficiently.

The thickness of the layer (A) is usually preferably 1 to 9 μm, and more preferably 1.5 to 8 μm and most preferably 2 to 6 μm.

The thickness of the layer (B) is usually preferably 0.5 to 5 μm, and more preferably 1 to 4 μm and most preferably 1.5 to 3.5 μm.

If the thickness of the layer (B) is less than 0.1 μm, the bottom of the irregularity in the surface of the layer (A) may be embedded properly and the effect of improvement of color tone may be decreased. If the thickness of the layer (B) is more than 5 μm, the glare-proofing property may be decreased.

The surface of the layer (B) has preferably a satisfactory level of hardness as the surface is not scratched even if a load having a steal wool hardness and a weight of 200 or more $g/cm^2$ is applied on the surface.

The curable composition can contain an antimicrobial agent. As the antimicrobial agent, various antimicrobial agents can be used. The various antimicrobial agents includes silver based inorganic antimicrobial agents such as silver based inorganic antimicrobial agents containing zirconium phosphate as a support, silver based inorganic antimicrobial agents containing zeolite as a support, silver based inorganic antimicrobial agents containing calcium phosphate as a support, and silver based inorganic antimicrobial agents containing silica gel as a support; amino acid based organic antimicrobial agents such as organic antimicrobial agents formulating amino acid compound; and organic antimicrobial agents formulating nitrogen-containing sulfur compound. A compounding ratio of the antimicrobial agent can be selected to compound the proper amount of the antimicrobial agent in the curable composition, for adjusting the kinds of the antimicrobial agent used, the required antimicrobial property, retention time and the like.

The curable composition can contain optionally additive components such as a photo stabilizer, an ultraviolet absorbent, a catalyst, a colorant, an antistatic agent, lubricant, a leveling agent, a defoaming agent, a polymerization promoter, an antioxidant, a flame retarder, an infrared absorbent, a surfactant, and a surface modifier.

The curable composition containing an active energy ray curable compound can contain diluent to apply easily the curable composition. The diluent includes alcohols such as isobutanol and isopropanol; aromatic hydrocarbons such as benzene, toluene and xylene; aliphatic hydrocarbons such as hexane, heptane, octane, nonane and decane; esters such as ethyl acetate and butyl acetate; ketones such as methylethyl ketone, diethyl ketone and diisopropyl ketone; cellosolve based solvents such as ethyl cellosolve; and glycol ether based solvents such as propylene glycol monomethyl ether. The formulating amount of the diluent can be selected properly to obtain the required viscosity.

The method for applying the curable composition described above to the light-transmitting substrate film includes convenient methods such as bar coating method, knife coating method, roll coating method, blade coating method, die coating method, gravure coating method, and curtain coating method.

As the irradiated active energy ray, active energy rays generated from various active energy generation devices can be used. For example, as the ultraviolet ray, ultraviolet ray radiated from the ultraviolet lamp is usually used. As the ultraviolet lamp, ultraviolet lamps such as high pressure mercury lamps, fusion H lamps and xenon lamps which generate ultraviolet ray having usually a spectrum distribution in the region of 300 to 400 nm of wave length can be used. The irradiation amount of the ultraviolet ray is usually preferably 50 to 3000 mJ/cm$^2$ in quantity of light.

In the glare-proofing and light-transmitting hard coat film of the present invention, a barometer of the glare-proofing property includes a haze value of Hz(B) and a 60° gloss. Hz(B) is preferably not less than 3%. Also, the 60° gloss is preferably not more than 140. When Hz(B) is less than 3%, the glare-proofing property may be not obtained sufficiently. Also, when the 60° gloss is more than 140, the gloss degree of the surface is large, that is, the reflection of the light is large, and therefore, the high gloss degree becomes a cause which exerts a bad influence to the glare-proofing property. However, when Hz (B) is high too, the light-transmitting property may be decreased. In view of the balance between the glare-proofing property and the transparency, Hz(B) is preferably in the range of 3 to 40%, more preferably in the range of 5 to 30%, and most preferably in the range of 9 to 25%.

The surface resistivity of the glare-proofing and light-transmitting hard coat film of the present invention is preferably not more than $1.00 \times 10^{12} \Omega/\square$, more preferably not more than $5.00 \times 10^{11} \Omega/\square$, and most preferably not more than $1.00 \times 10^{9} \Omega/\square$. The lower limit value of the surface resistivity is preferably not less than $1.00 \times 10^{6} \Omega/\square$.

In the present invention, the pressure sensitive adhesive layer is preferably formed on a surface opposite to a surface of the light-transmitting substrate film on which the layer (A) and the layer (B) are formed.

The pressure sensitive adhesives comprised in the pressure sensitive adhesive layer includes pressure sensitive adhesives for optical uses, for example, acrylic based pressure sensitive adhesives, urethane based pressure sensitive adhesives and silicone based pressure sensitive adhesives. The thickness of the pressure sensitive adhesive layer is usually in the range of 5 to 100 µm, and preferably in the range of 10 to 60 µm.

As shown in the FIGURE, the present invention includes a cured resin layer (A) 2 and a cured resin layer (B) 3 on a surface of a light-transmitting substrate film 1.

EXAMPLE

The present invention is described more specifically by reference to embodiments thereof. It should be noted that the present invention is not intended to be limited by these embodiments.

Example 1

Preparation of Curable Composition 1 for Forming the Layer (A)

Into 100 parts by mass of urethane based hard coat agent (produced by ARAKAWA CHEMICAL INDUSTRIES LTD., trade name "BEAMSET 575CB", containing photopolymerization initiator, solid concentration: 100 percents by mass) as an active energy ray curable compound, 5 parts by mass of silicone beads microparticle having perfect sphere shape (produced by Momentive Performance Materials Japan LLC., trade name "TOSPEARL130", average particle size 3.0 µm, solid concentration 100 percents by mass) as the microparticle A, 210 parts by mass of ethyl cellosolve and 210 parts by mass of isobutanol were mixed homogeneously to prepare a curable composition in which the solid concentration was 20% by mass.

Preparation of Curable Composition 2 for Forming the Layer (B)

Into 100 parts by mass of urethane based hard coat agent (produced by ARAKAWA CHEMICAL INDUSTRIES LTD., trade name "BEAMSET 575CB", containing photopolymerization initiator, solid concentration: 100 percents by mass) as an active energy ray curable compound, 333.3 parts by mass of silica sol dispersed in isopropanol (produced by NISSAN CHEMICAL INDUSTRIES, LTD., trade name SILICA SOL "IPA-ST", average particle size 0.01 to 0.02 µm, solid concentration 30 percents by mass) as the microparticle B, 283.3 parts by mass of ethyl cellosolve and 283.3 parts by mass of isobutanol were mixed homogeneously to prepare a curable composition containing an active energy ray curable compound in which the solid concentration was 20% by mass.

<Formation of Glare-Proofing and Light-Transmitting Hard Coat Film>

On one surface of a polyethylene terephthalate resin film (produced by TOYOBO CO., LTD., trade name "A4300", a thickness of 100 µm) as a light-transmitting substrate film, the above described curable composition for forming the layer (A) was applied in an amount to form a layer having cured thickness of 2.5 µm by using a Myer bar, and dried in an oven for 1 minute at 70° C. And then, the dried layer was irradiated with ultraviolet ray by using a high pressure mercury lamp (quantity of light 180 mJ/cm$^2$) to form a cured resin layer of the layer (A). Next, the above described curable composition for forming the layer (B) was applied on the surface of the cured resin layer of the layer (A) in an amount to form a layer having cured thickness of 2.5 μm by a Myer bar, and dried in an oven for 1 minute at 70° C., And then, the dried layer was irradiated with ultraviolet ray by using a high pressure mercury lamp (quantity of light 300 mJ/cm$^2$) to form a cured resin layer of the layer (B). Thus, a glare-proofing and light-transmitting hard coat film was prepared. The total film thickness of the layer (A) and the layer (B) was 5.0 μm.

<Adhesion Processing of Glare-Proofing and Light-Transmitting Hard Coat Film>

On the opposite side surface of the polyethylene terephthalate resin film against to the surface on which the light-transmitting hard coat layer is formed, an acrylic pressure sensitive adhesive (produced by LINTEC Corporation, trade name "PU-V") was applied in an amount to form a layer having dried thickness of 20 μm by a roll knife coater, and dried in an oven for 1 minute at 70° C. to form the pressure-sensitive adhesive layer on the glare-proofing and light-transmitting hard coat film described above. And then, the surface of the pressure-sensitive adhesive layer was laminated to a release liner of a polyethylene terephthalate on which silicone release treatment was applied.

Example 2

Preparation of Curable Composition 3 for Forming the Layer (A)

Into 100 parts by mass of acrylic based hard coat agent (produced by Dainichiseika Color & Chemicals Mfg. Co., Ltd., trade name "SEIKABEAM EXF-01L(NS)", containing photopolymerization initiator, solid concentration 100 percents by mass) as an active energy ray curable compound, 5 parts by mass of crosslinked acrylic resin microparticle (produced by Soken Chemical & Engineering Co., Ltd., trade name "CHEMISNOW MX-500", average particle size 5.0 μm, solid concentration 100 percents by mass) as the microparticle A, 78.8 parts by mass of ethyl cellosolve and 78.8 parts by mass of isobutanol were mixed homogeneously to prepare a curable composition containing an active energy ray curable compound in which the solid concentration was 40% by mass.

Preparation of Curable Composition 4 for Forming the Layer (B)

Into 100 parts by mass of acrylic based hard coat agent (produced by Dainichiseika Color & Chemicals Mfg. Co., Ltd., trade name "SEIKABEAM EXF-01L(NS)", containing photopolymerization initiator, solid concentration 100 percents by mass) as an active energy ray curable compound, 500 parts by mass of silica sol dispersed in isopropanol (produced by NISSAN CHEMICAL INDUSTRIES, LTD., trade name "SILICA SOL IPA-ST-ZL", average particle size 0.07 to 0.1 μm, solid concentration 30 percents by mass) as the microparticle B was mixed homogeneously to prepare a curable composition containing an active energy ray curable compound in which the solid concentration was 41.7% by mass.

<Formation of Glare-Proofing and Light-Transmitting Hard Coat Film>

On one surface of a polyethylene terephthalate resin film (produced by TOYOBO CO., LTD., trade name "A4300", a thickness of 100 μm) as a light-transmitting substrate film, the above described curable composition for forming the layer (A) was applied in an amount to form a layer having cured thickness of 4.5 μm by using a Myer bar, and dried in an oven for 1 minute at 70° C. And then, the dried layer was irradiated with ultraviolet ray by using a high pressure mercury lamp (quantity of light 180 mJ/cm$^2$) to form a cured resin layer of the layer (A). Next, the above described curable composition for forming the layer (B) was applied on the surface of the cured resin layer of the layer (A) in an amount to form a layer having cured thickness of 4 μm by a Myer bar, and dried in an oven for 1 minute at 70° C. And then, the dried layer was irradiated with ultraviolet ray by using a high pressure mercury lamp (quantity of light 300 mJ/cm$^2$) to form a cured resin layer of the layer (B). Thus, a glare-proofing and light-transmitting hard coat film was prepared. The total film thickness of the layer (A) and the layer (B) was 8.5 μm.

<Adhesion Processing of Glare-Proofing and Light-Transmitting Hard Coat Film>

On the opposite side surface of the polyethylene terephthalate resin film against to the surface on which the light-transmitting hard coat layer is formed, an acrylic pressure sensitive adhesive (produced by LINTEC Corporation, trade name "PU-V") was applied in an amount to form a layer having dried thickness of 20 μm by a roll knife coater, and dried in an oven for 1 minute at 70° C. to form the pressure-sensitive adhesive layer on the glare-proofing and light-transmitting hard coat film described above. And then, the surface of the pressure-sensitive adhesive layer was laminated to a release liner of a polyethylene terephthalate on which silicone release treatment was applied.

Example 3

A glare-proofing and light-transmitting hard coat film was prepared in the same method as described in Example 1, except that curable composition 5 for forming the layer (A) prepared by the preparation method shown in the following was used instead of curable composition 1 for forming the layer (A), curable composition 6 for forming the layer (B) prepared by the preparation method shown in the following was used instead of curable composition 2 for forming the layer (B), the film thicknesses of the layer (A) and the layer (B) were 3 μm respectively, and the total film thickness of the layer (A) and the layer (B) was 6 μm. Also, an adhesion processing of glare-proofing and light-transmitting hard coat film was conducted in the same method as described in Example 1.

<Preparation of Curable Composition 5 for Forming the Layer (A)>

Into 100 parts by mass of pentaerythritol acrylate (produced by TOAGOSEI CO. LTD., trade name "ALLONIX M-305", solid concentration: 100 percents by mass) as an active energy ray curable compound, 3 parts by mass of 1-hydroxy-cyclohexyl-phenyl-ketone (produced by Ciba Specialty Chemicals K.K., trade name "IRGACURE 184", solid concentration 100 percents by mass) as a photopolymerization catalyst, 3 parts by mass of silicone beads microparticle having sphere shape (produced by Momentive Performance Materials Japan LLC., trade name "TOSPEARL145", average particle size 4.5 μm, solid concentration 100 percents by mass) as the microparticle A, 79.5 parts by mass of ethyl cellosolve and 79.5 parts by mass of isobutanol were mixed homogeneously to prepare a curable composition containing an active energy ray curable compound in which the solid concentration was 40% by mass.

<Preparation of Curable Composition 6 for Forming the Layer (B)>

Into 100 parts by mass of acrylic based hard coat agent (produced by Dainichiseika Color & Chemicals Mfg. Co., Ltd., trade name "SEIKABEAM EXF-01L(NS)", containing photopolymerization initiator, solid concentration 100 percents by mass) as an active energy ray curable compound, 833.3 parts by mass of antimony-doped tin oxide microparticle having sphere shape dispersed in toluene (produced by ISHIHARA SANGYO KAISHA, LTD., trade name "SNS-10T", average particle size 0.02 µm, solid concentration 30 percents by mass) as the microparticle B having conductive property, 408.3 parts by mass of toluene and 408.3 parts by mass of cyclohexanone were mixed homogeneously to prepare a curable composition in which the solid concentration was 20% by mass.

Example 4

A the glare-proofing and light-transmitting hard coat film was prepared in the same method as described in Example 1, except that curable composition 7 for forming the layer (A) prepared by the preparation method shown in the following was used instead of curable composition 1 for forming the layer (A), the film thickness of the layer (B) is 2 µm, and the total film thickness of the layer (A) and the layer (B) was 6 µm. Also, an adhesion processing of glare-proofing and light-transmitting hard coat film was conducted in the same method as described in Example 1.

<Preparation of Curable Composition 7 for Forming the Layer (A)>

Into 100 parts by mass of acrylic based hard coat agent (produced by Dainichiseika Color & Chemicals Mfg. Co., Ltd., trade name "SEIKABEAM EXF-01L(NS)", containing photopolymerization initiator, solid concentration 100 percents by mass) as an active energy ray curable compound, 5 parts by mass of amorphous silicone beads microparticle (produced by Momentive Performance Materials Japan LLC., trade name "TOSPEARL240", average particle size 4.0 µm, solid concentration 100 percents by mass) as the microparticle A, 500 parts by mass of antimony-doped tin oxide conductive microparticle having acicular shape dispersed in methylethyl ketone (produced by ISHIHARA SANGYO KAISHA, LTD., trade name "FSS-10M", average particle size 0.1 µm, solid concentration 30 percents by mass) as a microparticle used together with the microparticle A, and 32.5 parts by mass of toluene were mixed homogeneously to prepare a curable composition containing an active energy ray curable compound in which the solid concentration was 40% by mass.

Comparative Example 1

A the glare-proofing and light-transmitting hard coat film was prepared in the same method as described in Example 3, except that the layer (B) was not laminated in Example 3. That is, a glare-proofing and light-transmitting hard coat film in which only the layer (A) was formed, was prepared.

Comparative Example 2

A the glare-proofing and light-transmitting hard coat film was prepared in the same method as described in Example 1, except that the layer (B) was not laminated in Example 1. That is, a glare-proofing and light-transmitting hard coat film in which only the layer (A) was formed, was prepared.

Comparative Example 3

A the glare-proofing and light-transmitting hard coat film was prepared in the same method as described in Example 2, except that the layer (B) was not laminated in Example 2. That is, a glare-proofing and light-transmitting hard coat film in which only the layer (A) was formed, was prepared.

Comparative Example 4

A the glare-proofing and light-transmitting hard coat film was prepared in the same method as described in Example 4, except that the layer (B) was not laminated in Example 4. That is, a glare-proofing and light-transmitting hard coat film in which only the layer (A) was formed, was prepared.

Comparative Example 5

A the glare-proofing and light-transmitting hard coat film was prepared in the same method as described in Example 1, except that curable composition 8 for forming the layer (B) prepared by the preparation method shown in the following was used instead of curable composition 2 for forming the layer (B) in Example 1, the film thickness of the layer (A) were 4.5 µm, the film thickness of the layer (B) were 2 µm, and the total film thickness of the layer (A) and the layer (B) was 6.5 µm.

<Preparation of Curable Composition 8 for Forming the Layer (B)>

Into 100 parts by mass of acrylic based hard coat agent (produced by Dainichiseika Color & Chemicals Mfg. Co., Ltd., trade name "SEIKABEAM EXF-01L(NS)", containing photopolymerization initiator, solid concentration 100 percents by mass) as an active energy ray curable compound, 1.5 parts by mass of silicone beads microparticle having perfect sphere shape (produced by Momentive Performance Materials Japan LLC., trade name "TOSPEARL1110", average particle size 11.0 µm, solid concentration 100 percents by mass) as the microparticle B, 203 parts by mass of ethyl cellosolve and 203 parts by mass of isobutanol were mixed homogeneously to prepare a curable composition in which the solid concentration was 20% by mass.

Average particle size and concentration of the microparticle in the layer (A) and the layer (B), and film thickness of the layer (A) and the layer (B) of the glare-proofing and light-transmitting hard coat films obtained in Examples and Comparative Examples are shown in Table 1.

Properties of the glare-proofing and light-transmitting hard coat films obtained in Examples and Comparative Examples are shown in Table 2.

Haze value, 60° gloss, center line average roughness, maximum height, film thickness, color tone and surface resistivity were measured by the method shown in the following and evaluated.

(1) Haze Value

The haze value was measured by using a turbidimeter (produced by NIPPON DENSHOKU INDUSTRIES CO. LTD., trade name "NDH 2000") pursuant to JIS K7136.

(2) 60° Gloss

The 60° gloss was measured by using a gloss meter (produced by NIPPON DENSHOKU INDUSTRIES CO. LTD., trade name "VG 2000") pursuant to JIS K7105.

(3) Center Line Average Roughness

The center line average roughness was measured by using a surface roughness measurement machine (produced by MITUTOYO CORPORATION, trade name "SURFTEST SV-300") pursuant to JIS B0633.

(4) Maximum Height

The maximum height was measured by using a surface roughness measurement machine (produced by MITUTOYO CORPORATION, trade name "SURFTEST SV-300") pursuant to JIS B0633.

(5) Average Particle Size of Microparticle
(5-1) Measurement of Microparticle Having an Average Particle Size of 1 μm or More The microparticle was dispersed in propylene glycol monomethyl ether in an amount to obtain the concentration of solid component of 3 parts by mass. And then, the average particle size of microparticle was measured by using a laser diffraction/diffusion particle size distribution measurement device (produced by HORIBA, Ltd., device name "LA-920")
(5-2) Measurement of Microparticle Having an Average Particle Size of Less Than 1 μm The average particle size of the microparticle B used in Example 2 indicated the value measured by gas adsorption method (BET method). The average particle size of the microparticles having an average particle size of less than 1 μm other than the microparticle B used in Example 2 indicated the value measured based on the dynamic diffusion method of a laser diffraction/diffusion.
(6) Film Thickness of the Layer (A) and the Layer (B)

The layer (A) and the layer (B) were applied to an untreated surface of a polyethylene terephthalate film having a thickness of 25 μm (produced by TOYOBO CO., LTD., trade name "A4100") instead of the light-transmitting substrate film used in Examples and Comparative Examples. And, the thickness of the polyethylene terephthalate film itself, the thickness of the film having only the layer (A), and the thickness of the film having the layer (A) and the layer (B) (except for Comparative Examples 1 to 4) were measured by using a simple digital length measurement system (produced by Nikon Corporation, trade name "DIGI MICRO MH-15M"). The film thickness of the layer (A) and the layer (B) in Examples and Comparative Examples were decided by the differences of each thicknesses.

(7) Color Tone

Test pieces were prepared by painting out the opposite side surface against to the surface of the light-transmitting substrate film on which the light-transmitting hard coat layer was formed, with an oil pencil (produced by MITSUBISHI PENCIL CO., LTD., trade name "MITSUBISHI PAINT MARKER PX-30 black"). The test pieces were observed by visual from the upper of the light-transmitting hard coat layer. The evaluations were conducted by five test persons.

The test pieces were evaluated to the following ranking by standardizing the glare-proofing and light-transmitting hard coat film of comparative example 1 in which only the layer (A) was laminated as the hard coat layer.

◎: Black color was improved certainly compared with the standard.
○: Black color was improved than the standard, but whitish color remained at little.
×: Whitish color was the same as that of the standard.

(8) Surface Resistivity

The surface resistivity of the glare-proofing and light-transmitting hard coat film was measured under the condition of URS probe and an applied voltage of 10 V by using a surface high resistivity meter (produced by MITSUBISHI CHEMICAL Co., Ltd., trade name "HIGHRESTER UP"). The upper limit of measurement obtained by using the surface resistivity meter was $1.00 \times 10^{12} \Omega/\square$, and therefore, the measurement value which was more than the upper limit of measurement could not be measured. Accordingly, the measurement value which was more than the upper limit of measurement was shown as "more than $1.00 \times 10^{12} \Omega/\square$." As the surface resistivity was smaller, it is superior in a property that an attachment of dust on the surface can be prevented when the glare-proofing and light-transmitting hard coat film is used for the display.

TABLE 1

| | Layer(A) | | | Layer(B) | | |
|---|---|---|---|---|---|---|
| | Microparticle A | | | Microparticle B | | |
| | Average particle size (μm) | Compounding ratio (parts by mass)*1 | Film thickness (μm) | Average particle size (μm) | Compounding ratio (parts by mass)*1 | Film thickness (μm) |
| Example 1 | 3.0 | 5.0 | 2.5 | 0.01~0.02 | 100 | 2.5 |
| Example 2 | 5.0 | 5.0 | 4.5 | 0.07~0.1 | 150 | 4.0 |
| Example 3 | 4.5 | 3.0 | 3.0 | 0.02 | 250 | 3.0 |
| Example 4 | 4.0 (0.1)*2 | 5.0 (150)*2 | 2.5 | 0.01~0.02 | 100 | 2.5 |
| Comparative Example 1 | 4.5 | 3.0 | 3.0 | — | — | — |
| Comparative Example 2 | 3.0 | 5.0 | 2.5 | — | — | — |
| Comparative Example 3 | 5.0 | 5.0 | 4.5 | — | — | — |
| Comparative Example 4 | 4.0 (0.1)*2 | 5.0 (150)*2 | 2.5 | — | — | — |
| Comparative Example 5 | 11.0 | 1.5 | 4.5 | 0.01~0.02 | 100 | 2.0 |

The superior figures shown in Table indicate the followings.
*1 the value is the compounding ratio of the microparticle to 100 parts by mass of the active energy ray curable compound in each layers.
*2 the value shown in parentheses is the value of the microparticle used together with the micropartilce A.

TABLE 2

| | Haze value Hz (B) | 60° Gloss | Color tone | Surface resistivity (Ω/□) | Center line average roughness Ra (B) (μm) | Maximum height Rz (B) (μm) |
|---|---|---|---|---|---|---|
| Example 1 | 10.53 | 136.7 | ◎ | More than $1.00 \times 10^{12}$ | 0.1547 | 1.1352 |
| Example 2 | 8.22 | 134.4 | ◎ | More than $1.00 \times 10^{12}$ | 0.2884 | 2.2376 |
| Example 3 | 18.94 | 62.0 | ◎ | $8.70 \times 10^8$ | 0.1628 | 1.2173 |
| Example 4 | 20.27 | 68.6 | ○ | $4.84 \times 10^{11}$ | 0.1854 | 1.2268 |
| Comparative Example 1 (standard) | 29.58 | 39.1 | X | More than $1.00 \times 10^{12}$ | 0.3925 | 2.5176 |

TABLE 2-continued

|  | Haze value Hz (B) | 60° Gloss | Color tone | Surface resistivity (Ω/□) | Center line average roughness Ra (B) (μm) | Maximum height Rz (B) (μm) |
|---|---|---|---|---|---|---|
| Comparative Example 2 | 30.30 | 35.6 | X | More than $1.00 \times 10^{12}$ | 0.2157 | 1.6592 |
| Comparative Example 3 | 12.98 | 128.4 | X | More than $1.00 \times 10^{12}$ | 0.3684 | 2.4372 |
| Comparative Example 4 | 46.75 | 25.2 | X | $3.85 \times 10^{7}$ | 0.4277 | 2.6378 |
| Comparative Example 5 | 20.89 | 43.5 | X | More than $1.00 \times 10^{12}$ | 0.5829 | 5.3236 |

The glare-proofing and light-transmitting hard coat film of the present invention can be utilized as panels for various articles and the like, such as an information terminal which includes liquid crystal displays (LCD) and plasma displays (PDP).

The glare-proofing and light-transmitting hard coat film of the present invention can suppress the decrease of the glare-proofing property, have a satisfactory level of a glare-proofing property and display a black color on an image more intensely (improve the color tone).

The invention claimed is:

1. A glare-proofing and light-transmitting hard coat film, which comprises a cured resin layer (A) of a curable composition containing an active energy ray curable compound and a microparticle dispersed therein and a cured resin layer (B) of a curable composition containing an active energy ray curable compound and a microparticle dispersed therein, the layer (A) and the layer (B) being laminated in order on at least one surface of a light-transmitting substrate film, wherein a total film thickness of the layer (A) and the layer (B) is 1 to 10 μm, a microparticle (a) having an average particle size of 0.5 to 10 μm is compounded in the layer (A) in an amount of 0.5 to 60 parts by mass to 100 parts by mass of an active energy ray curable compound, and a microparticle (b) having an average particle size which is 0.001 to 0.49 μm is compounded in the layer (B), wherein the compounding ratio (mass ratio) of the microparticle (b) in the layer (B) to 100 parts by mass of the active energy ray curable compound is 5 to 150 times the compounding amount of the microparticle (a) in the layer (A) to 100 parts by mass of the active energy ray curable compound.

2. The glare-proofing and light-transmitting hard coat film as claimed in claim 1, wherein a film thickness of the layer (A) is not less than a film thickness of the layer (B).

3. The glare-proofing and light-transmitting hard coat film as claimed in claim 2, wherein the microparticle (b) in the layer (B) has an average particle size of 0.005 to 0.49 μm.

4. The glare-proofing and light-transmitting hard coat film as claimed in claim 3, wherein at least one microparticle in the layer (A) and/or the layer (B) is a conductive microparticle.

5. The glare-proofing and light-transmitting hard coat film as claimed in claim 2, wherein at least one microparticle in the layer (A) and/or the layer (B) is a conductive microparticle.

6. The glare-proofing and light-transmitting hard coat film as claimed in claim 1, wherein the microparticle (b) in the layer (B) has an average particle size of 0.005 to 0.49 μm.

7. The glare-proofing and light-transmitting hard coat film as claimed in claim 6, wherein at least one microparticle in the layer (A) and/or the layer (B) is a conductive microparticle.

8. The glare-proofing and light-transmitting hard coat film as claimed in claim 1, wherein at least one microparticle in the layer (A) and/or the layer (B) is a conductive microparticle.

* * * * *